United States Patent [19]
Smith et al.

[11] Patent Number: 4,821,680
[45] Date of Patent: Apr. 18, 1989

[54] SLIDING DOOR HARDWARE

[76] Inventors: Richard H. Smith, 264 Gale Ave.; Douglas N. Smith, 14 Belvedere Ave., both of Pittsfield, Mass. 01201

[21] Appl. No.: 113,751

[22] Filed: Oct. 28, 1987

[51] Int. Cl.[4] .......... A01K 1/00
[52] U.S. Cl. .......... 119/27; 49/411; 16/90
[58] Field of Search .......... 119/16, 27; 49/407, 49/410, 411; 292/264; 16/90, 96 R

[56] References Cited

U.S. PATENT DOCUMENTS

| | | | |
|---|---|---|---|
| 201,253 | 3/1878 | Kirkham | 119/27 |
| 2,815,543 | 12/1957 | Gates | 49/411 |
| 2,929,115 | 3/1960 | Beckstrom | 49/411 |
| 3,534,431 | 10/1970 | Uphoff | 49/410 X |
| 3,854,165 | 12/1974 | Haley | 49/410 X |
| 4,081,880 | 4/1978 | Edeus | 16/90 |
| 4,273,072 | 6/1981 | Choisel | 119/27 |

*Primary Examiner*—Robert P. Swiatek
*Attorney, Agent, or Firm*—Ross, Ross & Flavin

[57] ABSTRACT

A rail and latching system for cooperation with a sliding door associated with an animal stall includes an inverted U-shaped rail on the door bottom engageable with a U-shaped door guide on the animal stall and a latch slidably and releasably engageable with the door and animal stall.

1 Claim, 7 Drawing Sheets

SLIDING DOOR HARDWARE

BACKGROUND OF THE INVENTION

1. Field of the Invention

Our invention relates to hardware for sliding doors, and more particularly to hardware for cooperation with a sliding door such as associated with an animal stall, for example.

2. Description of the Prior Art

In prior art installations, especially those used with animal stalls, roller guides or angle guide brackets are employed and are mounted on the floor or protrude from a wall so that livestock at times become tangled in them. Such systems also employ a door stop in the form of an angle type bracket that also protrudes from a side wall for as much as four to five inches.

The prior art stalls have also used a sliding latch handle on stall doors. These sliding latches have been known to cause injury to many animals when the latches have not been opened all the way and the animals have been scraped on the flank or elsewhere when either entering or exiting a stall.

SUMMARY OF THE INVENTION

Our sliding door hardware eliminates these objectionable features by the provision of safe, inexpensive, easily installed sliding door hardware and door latching means.

DESCRIPTION OF THE PREFERRED EMBODIMENTS

It will be understood that the system to be described herefollowing may be used with either left hand or right hand sliding doors.

The door and/or animal stall may be constructed of wood or metal, with wood screws or bolts being used as the fastening means as appropriate.

Figure 1:
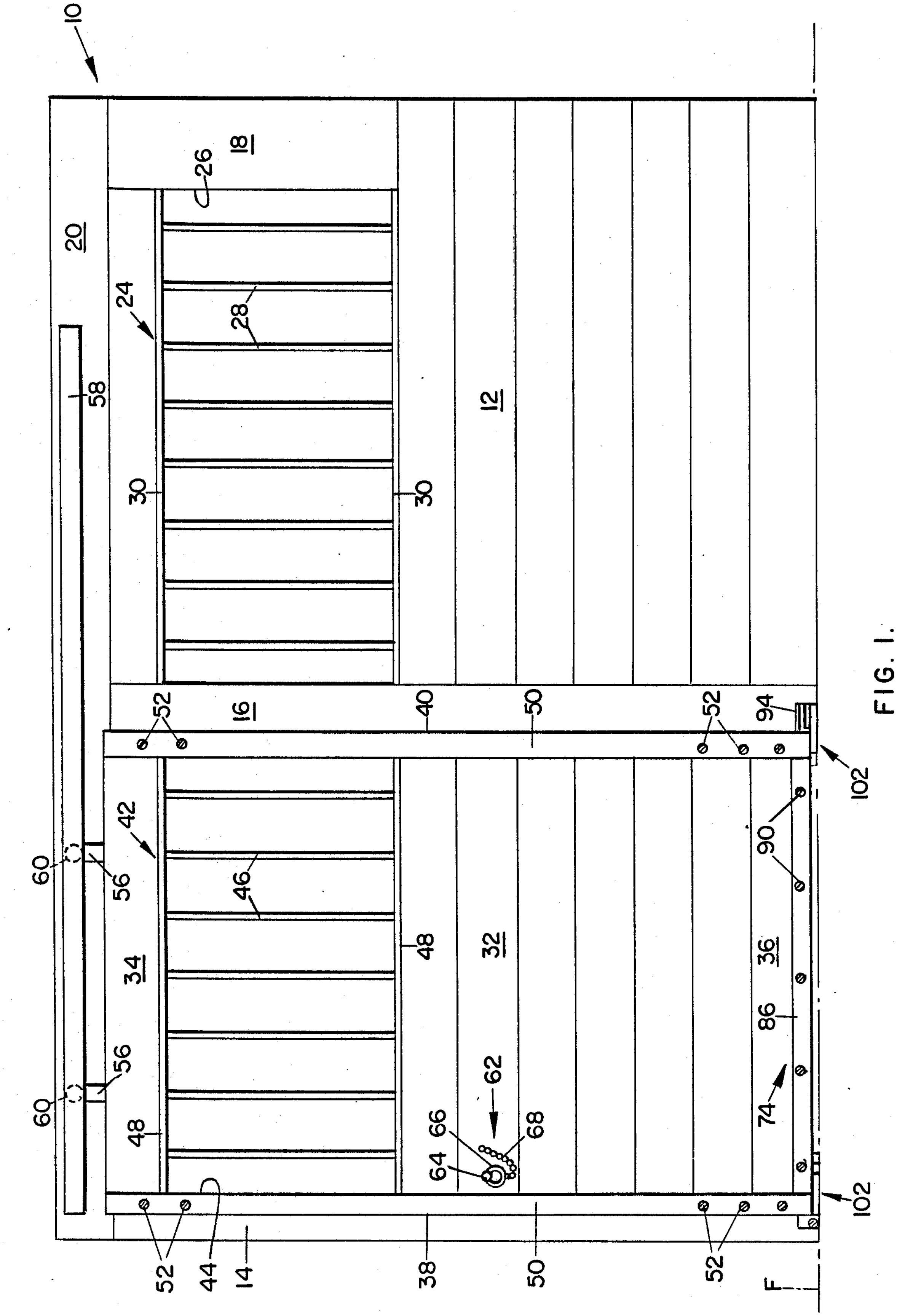
FIG. 1 is a front elevational view of an animal stall and slidable door incorporating hardware embodying one form of the invention, the door being shown in closed position.
Figure 2:
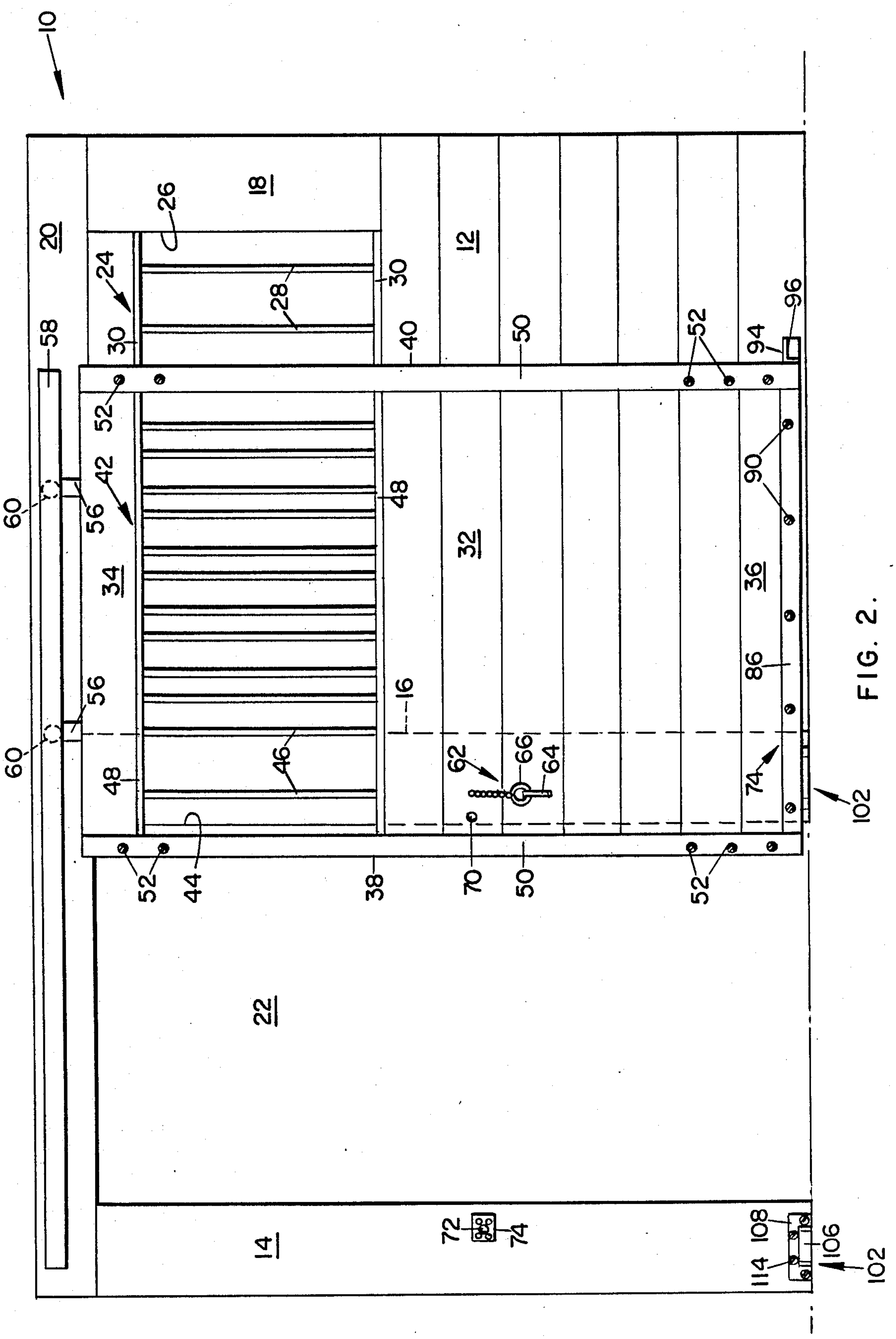
FIG. 2 is a front elevational view similar to FIG. 1, the door being shown in opened position.

Referring first to FIGS. 1 and 2, a generally square or rectangular animal stall 10 includes a front wall 12 and upright end walls 14 and 16 and an upright intermediate wall 18, interconnected by a horizontally-extending upper wall 20.

Upper wall 20, end wall 14 and intermediate wall 16 define a stall opening 22.

A grille 24 is disposed in an opening 26 in the upper portion of front wall 12, the grille comprising equi-spaced vertical bars 28 fixed at their opposite ends to horizontally-disposed cross members 30 fixed in opening 26.

The stall also includes the usual side and rear walls, not shown, which may also have grilles disposed therein for ventilation purposes.

A door 32 spans stall opening 22 and includes spaced, horizontally disposed upper and lower ends, 34 and 36 respectively, interconnected by upright forward and rearward end rails, 38 and 40 respectively.

A grille 42 is disposed in an opening 44 in the upper portion of the door, the grille comprising equi-spaced vertical bars 46 fixed at their opposite ends to horizontally-disposed cross members 48 fixed in opening 44.

Figure 9:
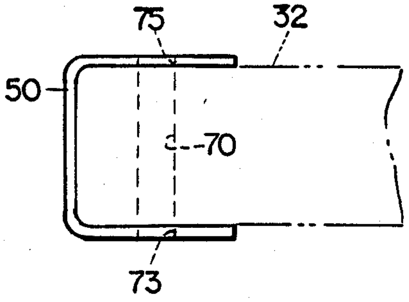
FIG. 9 is a top plan view of one of the door edge rails of the hardware of the invention.
Figure 10:
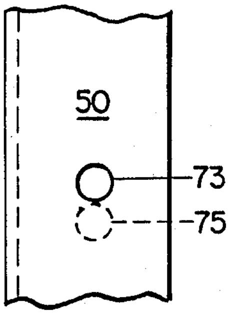
FIG. 10 is a fragmentary front elevational view of the door edge rail of FIG. 9.

Door end rails 38 and 40 are enclosed, reinforced and protected by U-shaped metal channel members 50, best seen in FIGS. 9 and 10, stationarily secured to the respective end rails as by screws 52 which pass through provided openings, now shown, in the channel members.

Door 32 is suspended by spaced, vertically disposed hangers 56 from a horizontally-disposed track 58 provided on stall upper wall 20, the hangers being fixed at their lower ends to door upper end 34 and having rollers 60 on their upper ends rideable in the track, wherefore the door may be slid between stall closed position, as shown in FIG. 1, and stall opened position, as shown in FIG. 2.

A pin latch assembly 62 includes a pin 64 carried by a ring 66 suspended from door 32 by a chain 68 and receivable in an angularly disposed opening 70 which passes transversely through the door into an aligned angularly disposed opening 72 in stall end wall 14, opening 72 being protected by a wear plate 74 fixed to the end wall.

The openings 70 and 72 are disposed at approximately a 15° angle to preclude accidental dislodgment of pin 64 therefrom.

Figure 3:
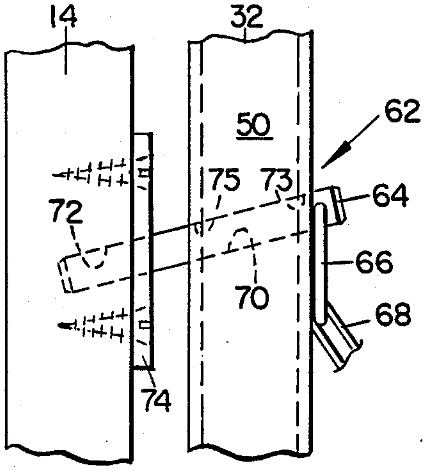
FIG. 3 is a fragmentary side elevational view of the latch of the hardware of the invention.
Figure 4:
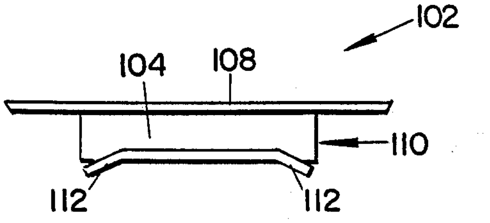
FIG. 4 is a top plan view of one form of door guide of the hardware of the invention.
Figure 5:
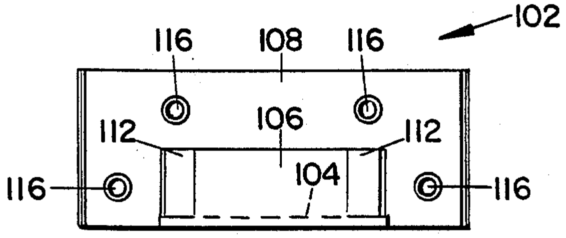
FIG. 5 is a front elevational view of the door guide of FIG. 4.

If greater strength, rigidity and wear resistance are desired for the pin latch assembly, additional openings 73 and 75 may be provided in the opposite faces of channel members 50, as shown in FIGS. 3, 9 and 10, these openings being aligned with opening 70 in door 32 for the passage of pin 64 therethrough.

Pin latch assembly 62 replaces the usual sliding latch handle presently employed on stall doors.

These sliding latches have been known to cause injury to many animals, when the latches have not been opened all the way and the animals scraped on the flank or elsewhere when either entering or exiting a stall. With pin latch assembly 62, the possibility of injury is almost non-existent.

Herefollowing, a door bottom guide system will be described for eliminating the roller guides or angle guide brackets of the prior art, which are mounted on the floor or protrude from a wall of the stall to the extent that livestock at times become tangled in them. It will also eliminate the angle type bracket which also protrudes from a stall side wall for as much as four to five inches and functions as a door stop.

Figure 6:
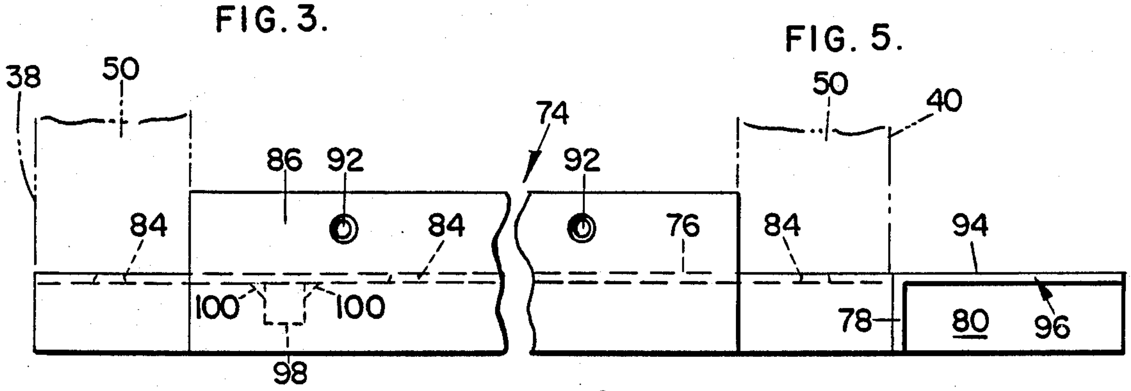
FIG. 6 is a fragmentary front elevational view of one form of door bottom rail of the hardware of the invention.
Figure 7:
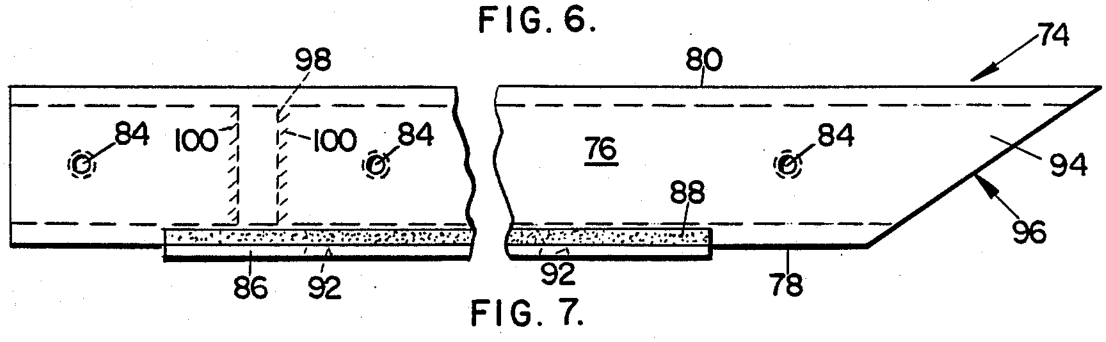
FIG. 7 is a top plan view of the door bottom rail of FIG. 6.
Figure 8:
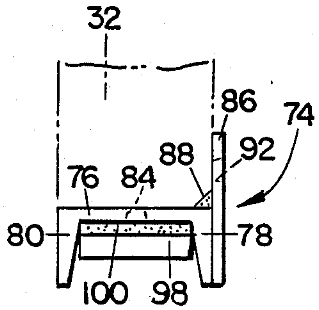
FIG. 8 is an end elevational view of the door bottom rail of FIG. 6 as seen from the left of FIG. 6.

An inverted U-shaped metal rail 74, best seen in FIGS. 6–8, is fixed to the bottom of door 32 and includes a longitudinally-extending horizontal planar wall 76 and spaced, parallel, vertically-disposed front and rear walls, 78 and 80 respectively, which depend from opposite sides of planar wall 76.

Planar wall 76 of rail 74 is stationarily secured to the bottom of door lower end 36 as by screws 82 which pass upwardly through provided openings 84 in the planar wall into the door.

An upright extension plate 86 is fixed to the outer face of front wall 78 of rail 74 as by a weldment 88 or the like and extends vertically-upwardly beyond the plane of rail planar wall 76.

Extension plate 86 is stationarily secured to the outer face of door lower end 36 as by screws 90 which pass inwardly through provided openings 92 in extension plate 86, to impart added strength and rigidity to the interconnection between rail 74 and door 32.

A tonguelike extremity 94 of rail planar wall 76 and rear wall 80 extends outboard of the adjacent vertical door end rail 40, with a leading edge 96 of planar wall 76 being inclined outwardly from front wall 78 to rear wall 80, for purposes to appear.

A stop 98, in the form of a square or rectangular bar, is fixed to the lower face of planar wall 76 adjacent one end of the rail as by weldments 100, or the like, and extends transversely between rail front wall 78 and rear wall 80, also for purposes to appear.

Inverted U-shaped rail 74 is open at both ends to eliminate any clogging or fouling that is so common with prior art sliding doors.

A pair of U-shaped door guides 102 is stationarily secured to the outer faces of the lower ends of each of stall end walls 14 and 16, with the door guides resting on the floor F or other supporting surface.

Each door guide 102 includes a horizontal lower planar wall 104 and spaced, parallel, upstanding front and rear walls 106 and 108 respectively at opposite sides of the planar wall defining an operating groove 110.

The opposite ends of front wall 106 are bent outwardly or offset as at 112 to provide easy access to groove 110.

Door guide lower wall 104 rests on floor F and each door guide is stationarily secured to a respective adjacent stall end wall as by screws 114 which pass through provided openings 116 in the door guide rear wall 108 and into the adjacent stall end wall.

The manner of engagement of the door bottom rail 74 with the door guides 102 will now be explained.

Figure 11:
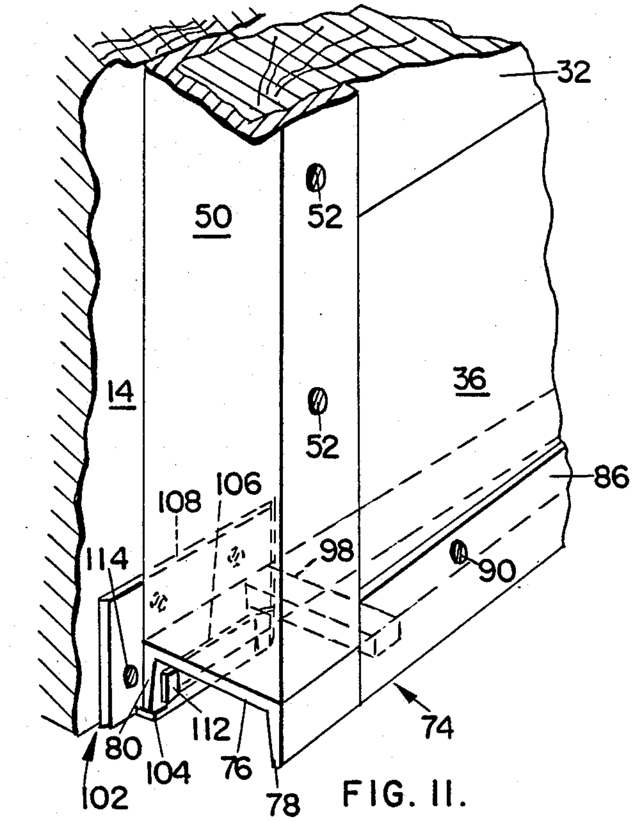
FIG. 11 is a fragmentary perspective view as seen from the left of FIG. 1 showing one end of the door bottom rail and its engagement with one of the door guides.
Figure 12:
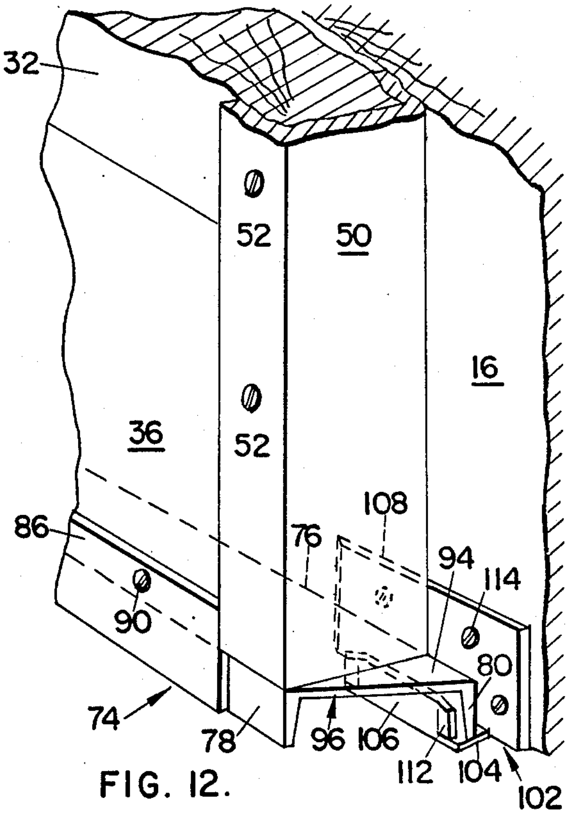
FIG. 12 is a fragmentary perspective view as seen from the right of FIG. 1 showing the opposite end of the door bottom rail and its engagement with another of the door guides.
Figure 15:
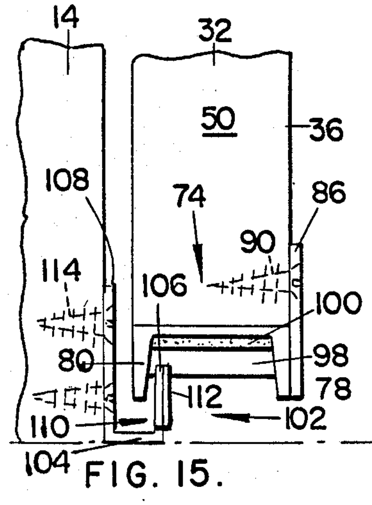
FIG. 15 is a fragmentary end elevational view as seen from the left of FIG. 11.

As best seen in FIGS. 11, 12 and 15, door 32 is so positioned forwardly of stall opening 22 that the rear wall 80 of inverted U-shaped door rail 74 is disposed in operating groove 110 of each door guide 102 so as to be freely slidable therein.

Figure 13:
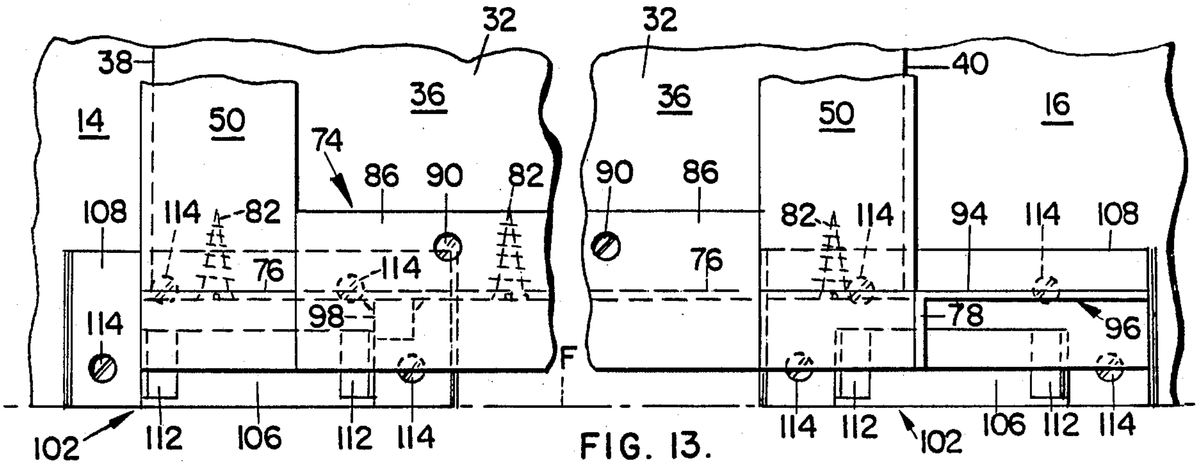
FIG. 13 is a fragmentary front elevational view showing both ends of the door bottom rail of FIG. 1 and its engagement with the door guides, the door being shown in closed position.

With door 32 in stall closed position spanning stall opening 22, rear wall 80 of rail 74 is disposed in the operating groove 110 of each of the door guides 102 on the stall end walls 14 and 16, with one face of stop 98 on rail 74 butting against the adjacent offset end 112 of front wall 106 of door guide 102 on stall end wall 14 as best seen in FIGS. 11 and 13 to effectively preclude further closing sliding movement of the door.

As previously stated, inclined leading edge 96 of tonguelike extremity 94 on rail 74 extends outboard of the adjacent vertical door end rail 40 for a distance of approximately three inches. Thus, tonguelike extremity 94 is disposed in operating groove 110 of door guide 102 on stall end wall 16 when door 32 is in stall closed position and facilitates full opening of the door.

Such tonguelike extremity facilitates sliding movement of the door to the stall opened position of FIG. 2, again with rear wall 80 of rail 74 disposed in operating groove 110 of the door guide.

Figure 14:
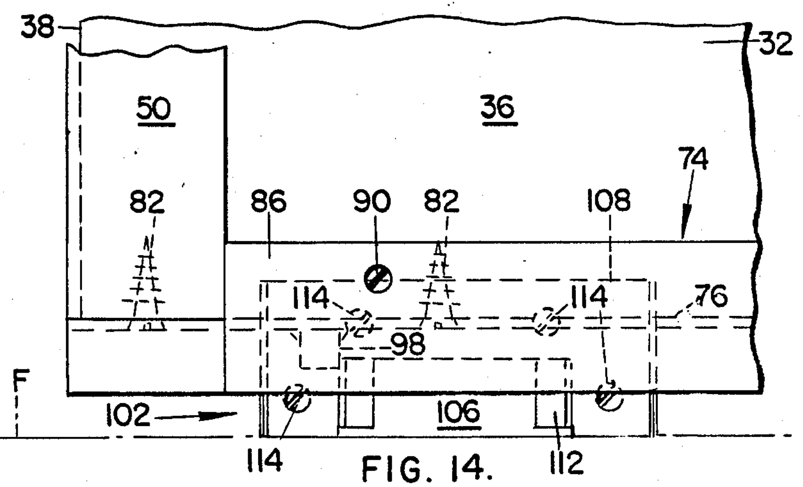
FIG. 14 is a fragmentary front elevational view showing the left-hand end of the door bottom rail of FIG. 1 and its engagement with one of the door guides, the door being shown in opened position.

The extent of opening movement of the door is determined when stop 98 on rail 74 abuts the adjacent offset end 112 of front wall 106 of door guide 102 on stall end wall 16, as best seen in FIG. 14.

Thus, the single stop 98 on rail 74, cooperantly with door guides 102, defines the limits of door closed and door opened positions.

FIGS. 16–21 disclose a modified form of centrally located U-shaped door guide 202 for use with side-by-side animal stalls having adjacent doors slidable in opposite directions between stall closed and stall opened positions.

The stalls, doors and other hardware of FIGS. 16–21 are otherwise identical to those described with reference to FIGS. 1–15; accordingly, it is not deemed necessary to describe those components again in detail.

Figure 16:
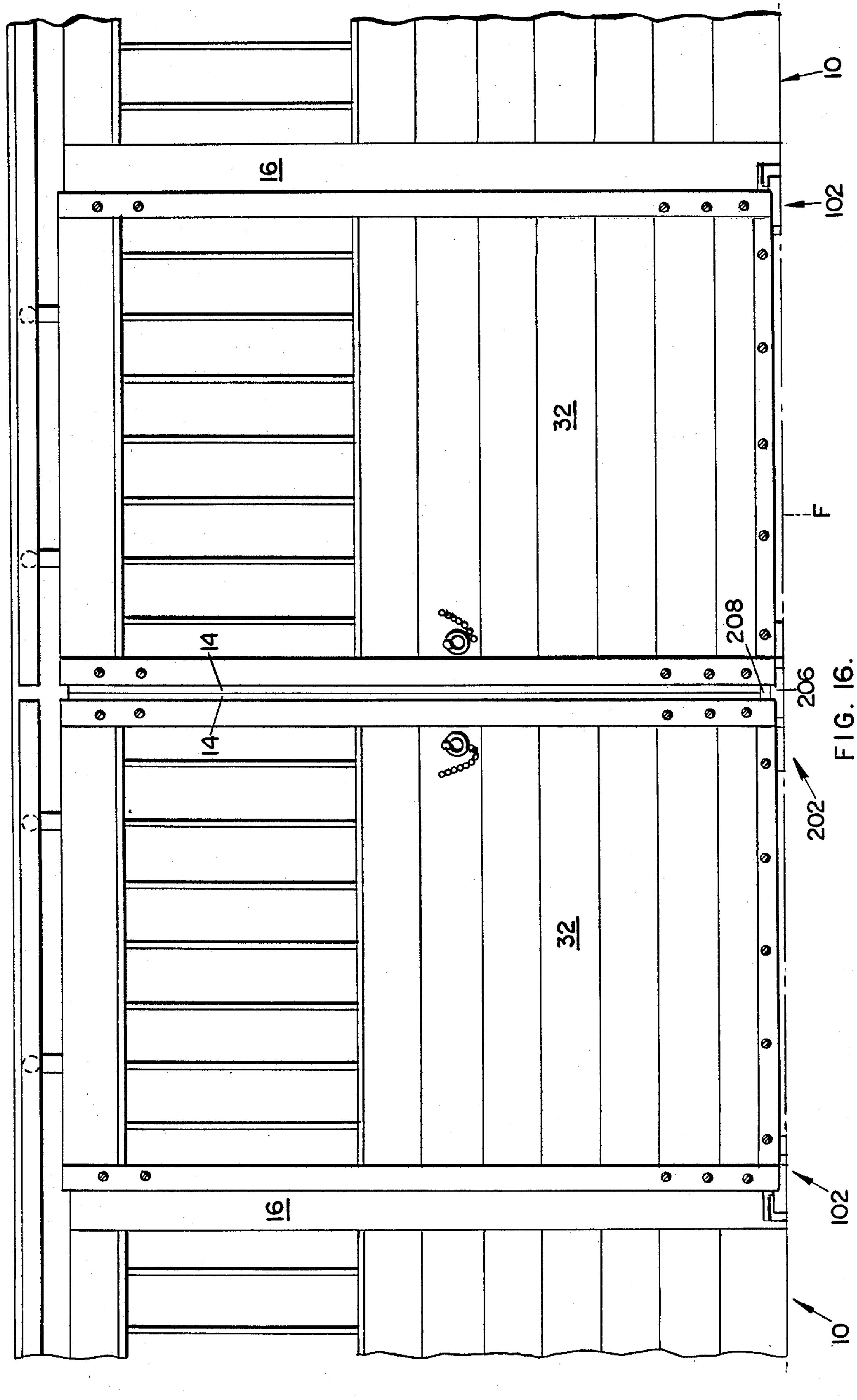
FIG. 16 is a front elevational view of a pair of side-by-side animal stalls and slidable doors incorporating hardware embodying a modified form of the invention, both doors being shown in closed position.
Figure 17:
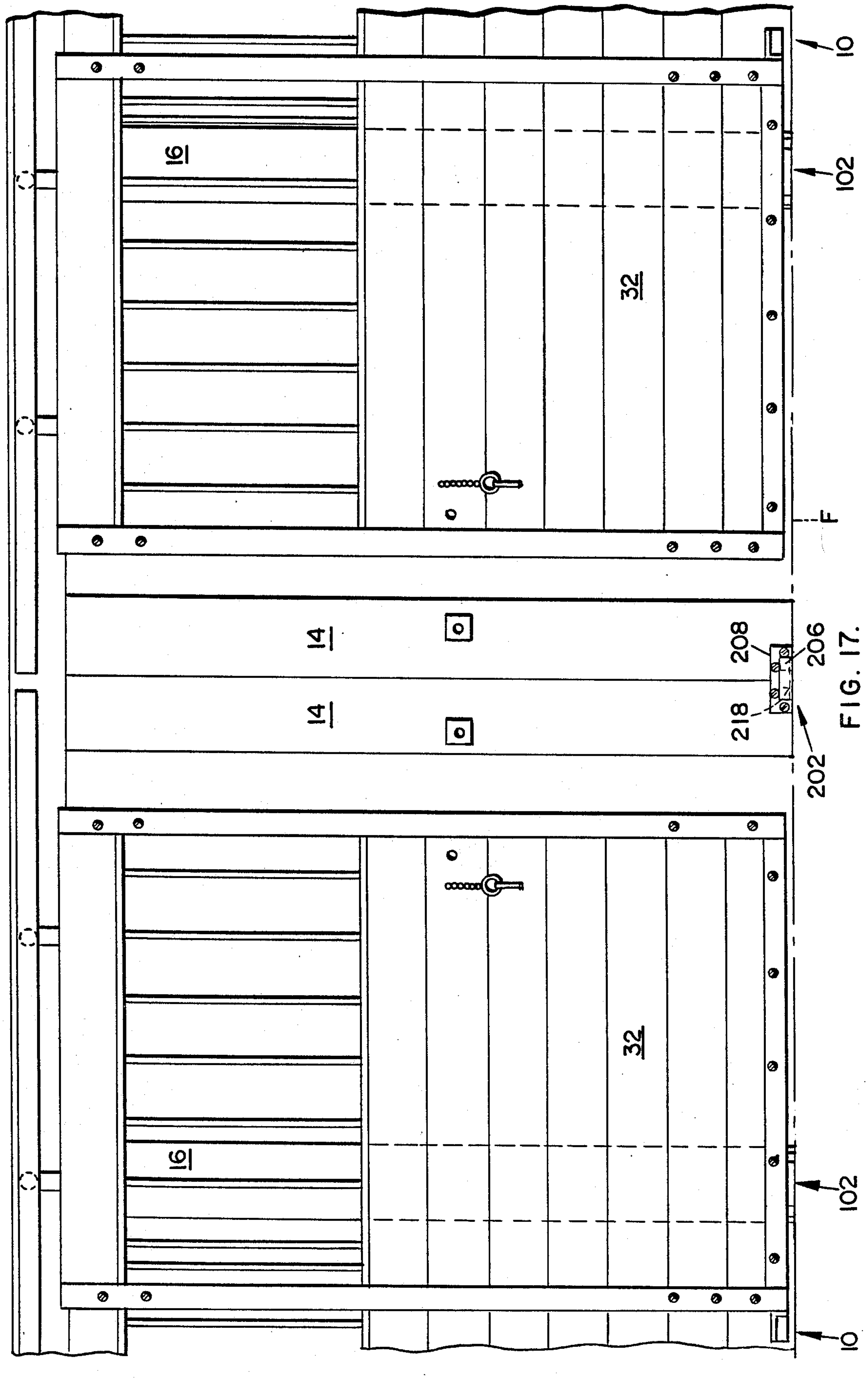
FIG. 17 is a front elevational view similar to FIG. 16, the doors being shown in partially opened position.
Figure 18:
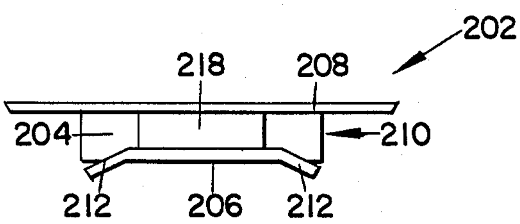
FIG. 18 is a top plan view of a modified form of door guide.
Figure 19:
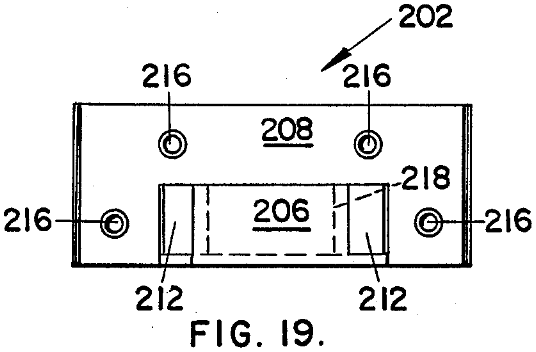
FIG. 19 is a front elevational view of the door guide of FIG. 18.
Figure 21:
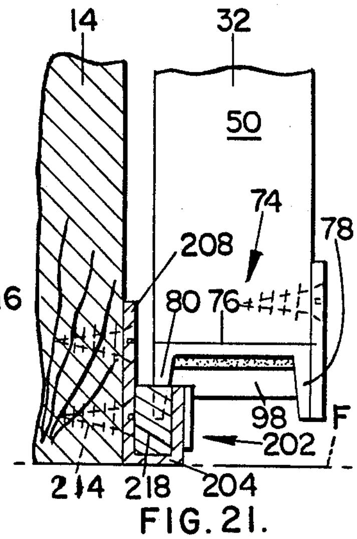
FIG. 21 is a cross sectional view taken on line 21—21 of FIG. 20.
Figure 20:
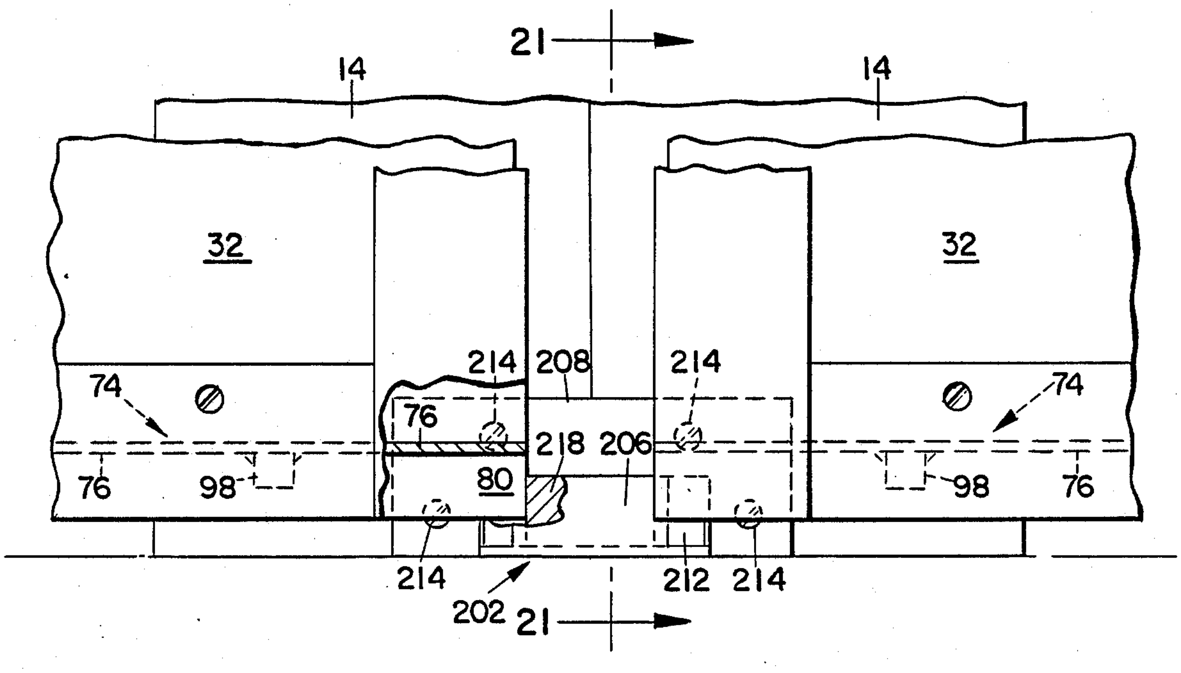
FIG. 20 is a fragmentary front elevational view showing the adjacent ends of the doors of FIG. 16 and the engagement of their bottom rails with the door guide of FIGS. 18 and 19.

In FIGS. 16 and 17, a modified U-shaped door guide 202 is located centrally between adjacent stall end walls 14 and doors 32 of animal stalls 10 with the door guide being stationarily secured to stall end walls 14 and resting on floor F.

Door guides 102 of the embodiment of FIGS. 1–15 are disposed adjacent the stall end walls 16 and the opposite ends of doors 32 and are stationarily secured to end walls 16.

Door guide 202 includes a horizontal lower planar wall 204 and spaced, parallel, upstanding front and rear walls 206 and 208 respectively at opposite sides of the planar wall defining an operating groove 210.

The opposite ends of front wall 206 are bent outwardly or offset as at 212 to provide easy access to groove 210.

Door guide 202 is stationarily secured to adjacent stall end walls 14 as by screws 214 which pass through provided openings 216 in the door guide rear wall 208 and into the adjacent stall end wall.

A stop 218, in the form of a square or rectangular block, is fixed to and disposed centrally of the upper face of lower planar wall 204 and extends between front wall 206 and rear wall 208 to close off operating groove 210 centrally of the door guide.

Stop 218 serves to limit closing movement of doors 32 when its opposite side walls are abutted by planar walls 76 and rear walls 80 of inverted U-shaped rails 74 on the bottom of the doors following entry of rails 74 into operating groove 210 of door guide 202 from opposite sides of the door guide.

Thus, the single door guide 202 serves both doors 32 of adjacent stalls 10 in door closed position.

Stops 98 on rails 74 will serve to limit the range of opening movement of doors 32 upon contact with door guides 102, as with the embodiment of FIGS. 1–15.

We claim:

1. In a rail system for cooperating with a door associated with an animal stall having a door opening therein and first and second end walls at opposite sides of the opening and with the opening being spannable by the door, the door being slidable between stall-opened and stall-closed positions, the improvement comprising:

upright U-shaped door channels enclosing and fixed to the opposite vertical edges of the door, a horizontally-disposed track fixed to the stall, hangers extending upwardly from the upper horizontal edge of the door and having rollers being rotatably mounted thereon and rideable in the track, the hangers and rollers suspending the door from the track, an inverted U-shaped rail having a horizontal planar wall and spaced depending front and rear walls at opposite sides of the planar wall, the planar wall of the rail being stationarily secured to the bottom of the door, an upright extension plate on the rail front wall fixed to the front of the door, the planar wall and rear wall of the inverted U-shaped rail having a tonguelike extremity extending outboard of a side edge of the door, a pair of U-shaped door guides, one disposed adjacent each stall end wall, each door guide having a horizontal planar wall and spaced upstanding front and rear walls at opposite sides of the planar wall defining an operating groove, the rear wall of each door guide being stationarily secured to one of the end walls of the stall, and the front wall of each door guide being offset and bent outwardly to provide easy access to the operating groove, all adapted and arranged whereby, as the door is slid between stall-closed and stall-opened positions, one of the depending walls of the rail is receivable in the operating groove of the door guide, a stop on the inverted U-shaped rail extending transversely between the front and rear walls thereof for limiting the range of sliding movement of the door upon contact with one of the walls of one of the door guides, and a latch on the door releasably engageable with one of the stall end walls, the latch comprising a pin slidably and releasably receivable in aligned angularly disposed openings in the door and end wall.

* * * * *